United States Patent [19]

Mulder

[11] 3,829,789

[45] Aug. 13, 1974

[54] MICROAMPERE CURRENT SOURCE

[75] Inventor: Cornelis Mulder, Emmasingel, Eindhoven, Netherlands

[73] Assignee: U.S. Philips Corporation, New York, N.Y.

[22] Filed: Dec. 6, 1972

[21] Appl. No.: 312,484

Related U.S. Application Data

[63] Continuation of Ser. No. 100,205, Dec. 21, 1970, abandoned.

[52] U.S. Cl. ........................ 330/23, 330/24, 307/237

[51] Int. Cl. ................................................ H03f 1/32

[58] Field of Search ..........330/30 D, 17, 23; 307/237

[56] References Cited

UNITED STATES PATENTS

| | | | |
|---|---|---|---|
| 2,885,494 | 5/1959 | Darlington et al. | 330/23 |
| 3,200,343 | 8/1965 | Skinner | 330/17 |
| 3,551,836 | 12/1970 | Greeson, Jr. | 330/30 D |
| 3,566,296 | 2/1971 | Liv | 330/30 D |

*Primary Examiner*—Nathan Kaufman
*Attorney, Agent, or Firm*—Frank R. Trifari

[57] ABSTRACT

A microampere current source for an integrated circuit comprising a first d-c current source for providing an input control current of at most 10 μa, first and second semiconductor circuits having substantially equal emitter characteristics, a resistor coupled to said first and second semiconductor circuits to form a closed loop and a second d-c current source coupled to the loop. The first semiconductor circuit comprises a rectifier and is coupled to the second semiconductor circuit so as to provide for the passage of the input control current through the base-emitter path of the semiconductor circuits. The second d-c current source provides a reference potential to the emitter of the second semiconductor circuit and supplies a current to the resistor of such magnitude that the voltage drop across the rectifier exceeds the base-emitter voltage of the second semiconductor circuit by between 20 and 540 millivolts.

3 Claims, 3 Drawing Figures

Figure 1:
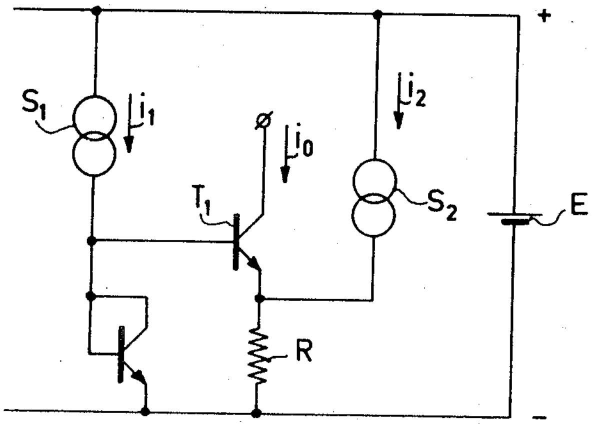

INVENTOR.
CORNELIS MULDER

BY

AGENT

INVENTOR.
CORNELIS MULDER

BY

AGENT

MICROAMPERE CURRENT SOURCE

This is a continuation, of application Ser. No. 100,205, filed Dec. 21, 1970, and now abandoned.

The invention relates to a microampere current source for an integrated circuit, in which from a control direct current of the order of 10 microamperes or less an attenuated direct current is derived, the control direct current flowing through a first circuit which includes a rectifying junction, while the attenuated direct current flows through the emitter collector path of a transistor the base emitter path of which has been included in a second circuit having the same pass direction and has been connected parallel to the aforementioned circuit, a substantially signal-free direct current for at least one transistor of the integrated circuit being derived from the collector of the aforementioned transistor, a resistor having been included in the closed loop constituted by the two parallel circuits.

A known microampere current source of this type includes a transistor which is connected as a diode in parallel with the series combination of the base emitter of another transistor and a resistor. The input current to be attenuated is supplied to the diode, the attenuated output current being taken from the collector of the transistor. The attenuation factor $\alpha$ is adjusted by means of the resistor, $\alpha$ being equal to the ratio between the output current and the input current. The resistor is determined by the following expression:

$$R = k\mathrm{T}/q \cdot 1n\alpha/i \quad (1)$$

In this expression $R$ is the value of the said resistor, $T$ *is the temperature of the microampere current source in degrees Kelvin,* $q$ the unit charge of an electron and $i$ the output current. The above expression (1) clearly shows that the value of the resistor $R$ must be very large if a very small output current $i$ is required. Thus, it can be computed by means of the said expression that if, for example, starting from an input current of 10 microamperes an output current of 0.1 microampere is desired, a resistor of 1.2 megohm is required. Such a resistor cannot be made in integrated form.

Another known microampere current source of the said type includes a transistor which is connected as a diode in parallel with the base emitter diode of another transistor. The input current to be attentuated is supplied to the diode and the attenuated output current is taken from the collector of the second transistor. In this known microampere current source, the attenuation factor by which the input current must be attenuated to obtain the output current is adjusted by means of the ratio between the effective emitter surface area of the transistor connected as a diode and the effective emitter surface area of the base emitter diode of the second transistor. This arrangement has the disadvantage that an increase in the desired value of $\alpha$ requires a relatively increased emitter area of the diode for the integrated circuit.

It is an object of the present invention to provide a solution of the aforementioned problems, and a microampere current source according to the invention is characterized in that the emitter of the second transistor has been connected to a point of constant potential by way of a current source which supplies to the resistor a current such that the voltage drop across the rectifying junction exceeds the voltage drop across the base emitter diode of the transistor by at least 20 millivolts and at most 540 millivolts.

Figure 3:
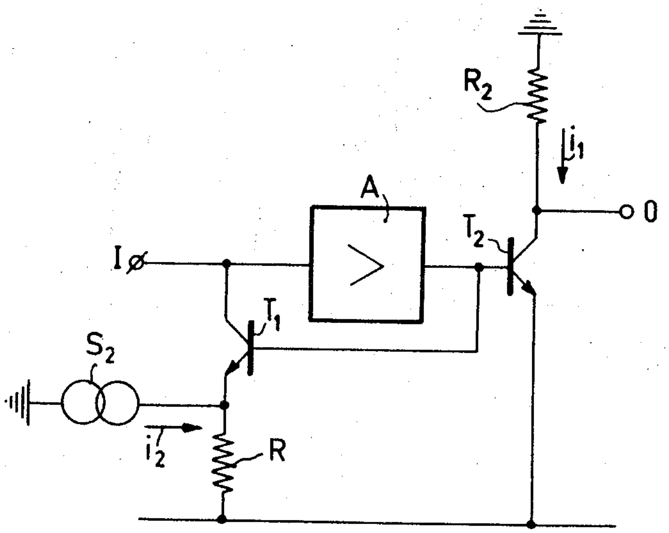
Figure 2:
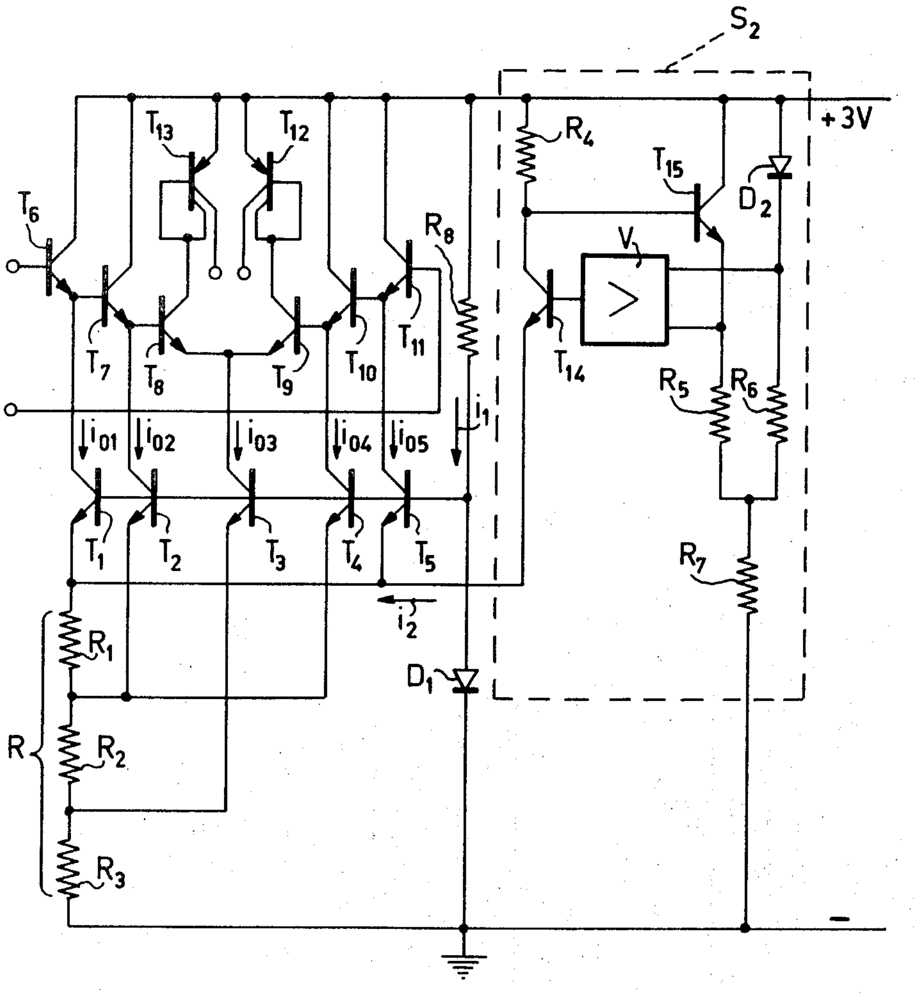

An embodiment of the invention will now be described, by way of example, with reference to the accompanying diagrammatic drawings, in which:

FIG. 1 shows an embodiment of a microampere current source according to the invention, FIG. 2 shows an example of the use of such a microampere current source, and FIG. 3 shows another example of the use of the microampere current source according to the invention.

The microampere current source shown in FIG. 1 comprises a transistor $T_1$, a transistor $D_1$ connected as a diode, current sources $S_1$ and $S_2$ and a resistor $R$. The base of the transistor $T_1$ is connected through the transistor $D_1$ to the negative terminal of a voltage supply source E and also, through the input current source $S_1$, to the positive terminal of the said voltage supply source E. The emitter of the transistor $T_1$ is connected through the resistor $R$ to the negative terminal of the supply voltage source E and also, through the current source $S_2$, to the positive terminal of said voltage supply source E. The output current can be derived from the collector of the transistor $T_1$.

The operation of the microampere current source according to the invention is as follows: It is assumed that it is desired to have an output current $i_0$ which is smaller than the input current $i_1$ by a factor $\alpha$, i.e., $i_1 = \alpha \cdot i_0$. By way of example, $i1$ may be equal to $10\mu$A, and $i_0$ to $0.1\mu$A and hence $\alpha = 100$. In addition, $R$ is required to be at most equal to 5,000 ohms. The voltage across the diode $D_1$ is equal to: $V_{D1} = kT/q \cdot 1n\ (i_1/i_{10})$ (2)

where $i_1$ is the input current and $i_{10}$ the intrinsic leakage current of the diode $D_1$. The voltage across the base emitter diode of the transistor $T_1$ is equal to: $V_{Dt} = kT/q \cdot 1n\ (i_0/\ i_{00})$ (3)

where $i_0$ is the output current and $i_{00}$ is the intrinsic leakage current through the transistor $T_1$. If the effective emitter surface area of the transistor is equal to the effective emitter surface area of the transistor $D_1$ connected as a diode, the voltage across the resistor $R$ is expressed by:

$$V_R = kT/q \cdot 1n\ (i_1 i_0) = kT/q \cdot 1n\alpha \quad (4)$$

With respect to the example chosen, a simple computation shows that $V_R$ must be equal to 120 millivolts. This means that the current $i_2$ to be supplied by the current source $S_2$ must at least be equal to 24 microamperes at $T = 300°$K.

FIG. 2 shows the use of the microampere current source in a differential amplifier. The differential amplifier comprises transistors $T_6$ to $T_{11}$. The signal to be amplified is applied to the bases of the transistors $T_6$ and $T_{11}$. The collectors of the transistors $T_6$, $T_7$, $T_{10}$ and $T_{11}$ are directly connected to the positive terminal of the supply voltage source E. The collectors of the transistors $T_8$ and $T_9$ are connected to the positive terminal of the voltage soupply source E through transistors $T_{13}$ and $T_{12}$ respectively. The base emitter paths of the transistors $T_{11}$, $T_{10}$ and $T_9$ and of the transistors $T_6$, $T_7$ and $T_8$ are connected in series, the emitters of the transistors $T_8$ and $T_9$ being connected to one another. Transistors $T_1$ through $T_5$ form parts of a multiple microampere current source, which further comprises the current source $S_2$, the diode $D_1$ and resistors R and $R_8$. The current source $S_2$ includes a differential amplifier V the output of which is connected to the base of a transistor $T_{14}$. A current $i_2$ is taken from the emitter of the transistor $T_{14}$ and supplied to the resistor R of the multiple microampere current source. The collector of the transistor $T_{14}$ is connected to the positive terminal of the voltage supply source E through a resistor $R_4$ and also to the base of the transistor $T_{15}$ connected as an emitter follower. The emitter of the transistor $T_{15}$ is connected to an input of the differential amplifier V and also, through the series combination of resistors $R_5$ and $R_7$, to the negative terminal of the voltage supply source E. The other input of the differential amplifier is connected to the positive terminal of the voltage supply source through a diode $D_2$ and also to the negative terminal of the voltage supply source through the series combination of resistors $R_6$ and $R_7$. The bases of the transistors $T_1$ to $T_5$ are connected to the positive terminal of the voltage supply source through a resistor $R_8$ and also to the negative terminal of the voltage supply source through the diode $D_1$. The emitters of the transistors $T_1$ and $T_5$ are connected to the negative terminal of the voltage supply source through the series combination of resistors $R_1$, $R_2$ and $R_3$. The emitters of the transistors $T_2$ and $T_4$ are connected to the junction point of the resistors $R_1$ and $R_2$. The emitter of the transistor $T_3$ is connected to the junction point of the transistors $R_2$ and $R_3$. The operation of the circuit arrangement shown in FIG. 2 is as follows:

The multiple current source is assumed to have to deliver the following output currents:

$$i_{01} = i_{05} = 0.3 \times 10^{-9} \text{ ampere,}$$

$$i_{02} = i_{04} = 6 \times 10^{-9} \text{ ampere}$$

$$i_{03} = 240 \times 10^{-9} \text{ ampere}$$

If we assume an input current $i_1 = 0.3 \times 10^{-3}$ ampere and a supply voltage of 3 volts, the resistor $R_8$ will have to be equal to 8,000 ohms and hence may readily be manufactured in integrated form. A simple computation shows that the voltage across the resistor R required for small output currents $i_{01}$ to $i_{05}$ will have to be 360 millivolts. The voltage across the sum of the resistors $R_2$ and $R_3$ must be 282 millivolts and the voltage across the resistor $R_3$ must be 204 millivolts. The aforementioned voltages are required at room temperature, that is to say, $T = 300°K$. If the sum of the resistors $R_1$, $R_2$ and $R_3$ is about 4,600 ohms, with $R_1 = R_2 = 1.000$ ohms and $R_3 = 2{,}600$ ohms, the current source $S_2$ will have to supply a current $i_2 = 70$ microamperes.

If the additional current $i_2$ were not passed through the resistor $R$, producing the aforementioned output currents $i_{01}$ to $i_{05}$ would require the resistor $R$ to be about 780 megohms. Such a resistor cannot be made in integrated form and consequently would have to be an external resistor connected to the integrated circuit, so that the latter must have an additional external terminal. Moreover, the large value of the resistor $R$ causes this terminal to be extremely sensitive to external disturbances. Also, the manufacture of resistors of such large values is difficult. Since present-day integrated circuit technology enables pairs of substantially identical transistors, i.e., transistors differing by less than 2 percent to be manufactured, the offset voltage introduced into the differential amplifier by, for example, $T_1$ and $T_5$ will be only 0.5 millivolt. A practical embodiment of a differential amplifier required an input current of less than $10^{-11}$ amperes at an offset voltage of at most 5 millivolts. The current source $S_2$ supplies a current $i_2$ according to the following expression:

$$i_2 = 1/R_4 \cdot (kT/q) \cdot 1n(R_5/\ R_6) \qquad (5)$$

where $R_4$, $R_5$ and $R_6$ are the resistance values of the resistors $R_4$, $R_5$ and $R_6$ of the circuit arrangement shown in FIG. 2. This expression shows that the said current is a function of the temperature T. According to the expression (4) the attenuation factor is a function of $V_R$ and of the temperature $T$. When $V_R$ is maintained constant, according to the expression (4) a change of temperature will cause a change of the attenuation factor. The expression (4) further shows that, if the voltage $V_R$ across the resistor $R$ varies directly with $kT/q$, the attenuation factor $\alpha$ will not change as a function of temperature. This has been achieved by causing the current $i_2$ according to the expression (5) to flow through the resistor $R$, assuming the resistors $R$ and $R_4$ to have equal temperature coefficients. The same effect is obtainable by causing a constant current $i_2$ to flow through the resistor $R$ and by ensuring that this resistor has a temperature coefficient such that the voltage produced across it will be proportional to $kTq$.

FIG. 3 shows a second example of the use of a microampere current source according to the invention. In this example, the microampere current source has been connected in the negative feedback loop of an amplifier A. The output of the amplifier is connected to the bases of the transistors $T_2$ and $T_1$. The emitter of the transistor $T_2$ is directly connected to a point of constant potential, and the emitter of the transistor $T_1$ is connected thereto through a resistor $R$. The emitter of the transistor $T_1$ is also connected to a current source $S_2$ which supplies a current $i_2$. The collector of the transistor $T_1$ is connected to the input I of the amplifier A. The amplified output signal may be derived from the collector of the transistor $T_2$.

The inclusion of the microampere current source in the negative feedback loop of the amplifier A ensures a constant current amplification from input to output. When the input current of the amplifier is negligible compared to the collector current of the transistor $T_1$, the output current $i_1$ will be substantially insensitive to variations in the transistor parameters of the transistors of the amplifier A. In addition, variations in the supply voltage of the amplifier substantially do not affect the output current $i_1$.

What is claimed is:

1. An integrated circuit for providing an attenuated direct current, comprising: a common terminal; a first direct current source for providing an input current to be attenuated; semiconductive rectifying means connected in forward direction between said first current source and said terminal; a transistor having a collector output circuit and a base-emitter path formed for passing current in the same direction as said rectifying means, the base of said transistor being connected to a common point of said first current source and said rectifying means, a second direct current source connected to the emitter of said transistor, a resistor connected between said terminal and a common point of said second current source and said emitter, said resistor having a value corresponding substantially to $kT/q \cdot 1n\alpha/i_2$, where *k is Boltsmann's constant*, $T$ is the absolute temperature, $q$ is the input charge of an electron, $i_2$ is the current supplied by the second current source, and $\alpha$ is the attenuation factor, said second current source being connected for passing the current in the same direction as said rectifying means, whereby the attenuated direct current is taken from the collector circuit of said transistor.

2. An integrated circuit as claimed in claim 1, wherein said semiconductive rectifying means is a base-emitter junction of a second transistor having an effective emitter surface area substantially equal to that of said first transistor.

3. A microampere current source as claimed in claim 1, characterized in that the resistor has a positive temperature coefficient, the current supplied by the second D.C. current source being constant.

* * * * *

PO-1050
(5/69)

UNITED STATES PATENT OFFICE
CERTIFICATE OF CORRECTION

Patent No. 3,829,789 Dated August 13, 1974

Inventor(s) CORNELIS MULDER

It is certified that error appears in the above-identified patent and that said Letters Patent are hereby corrected as shown below:

On the title page insert the following:

--[30] Foreign Application Priority Data

Dec. 25, 1969 Netherland...........6919466--.

Signed and sealed this 5th day of November 1974.

(SEAL)
Attest:

McCOY M. GIBSON JR.
Attesting Officer

C. MARSHALL DANN
Commissioner of Patents